(12) United States Patent
Donadon et al.

(10) Patent No.: US 11,439,055 B2
(45) Date of Patent: Sep. 13, 2022

(54) SOWING ELEMENT FOR AGRICULTURAL PRECISION SOWING MACHINES AND SOWING MACHINE COMPRISING THE SOWING ELEMENT

(71) Applicant: Maschio Gaspardo S.p.A., Campodarsego (IT)

(72) Inventors: Gianfranco Donadon, Concordia Sagittaria (IT); Luigi Giovanni Bot, Portogruaro (IT); Bruno Miolo, Concordia Sagittaria (IT)

(73) Assignee: Maschio Gaspardo S.p.A., Campodarsego (IT)

(*) Notice: Subject to any disclaimer, the term of this patent is extended or adjusted under 35 U.S.C. 154(b) by 256 days.

(21) Appl. No.: 16/762,592

(22) PCT Filed: Nov. 9, 2018

(86) PCT No.: PCT/IB2018/058840
§ 371 (c)(1),
(2) Date: May 8, 2020

(87) PCT Pub. No.: WO2019/092659
PCT Pub. Date: May 16, 2019

(65) Prior Publication Data
US 2021/0153423 A1  May 27, 2021

(30) Foreign Application Priority Data

Nov. 10, 2017 (IT) .................. 102017000128557
Nov. 10, 2017 (IT) .................. 102017000128764

(51) Int. Cl.
| | | |
|---|---|---|
| A01C 7/08 | (2006.01) | |
| A01C 7/20 | (2006.01) | |
| A01C 7/04 | (2006.01) | |

(52) U.S. Cl.
CPC .............. *A01C 7/082* (2013.01); *A01C 7/046* (2013.01); *A01C 7/206* (2013.01)

(58) Field of Classification Search
CPC ......... A01C 7/082; A01C 7/046; A01C 7/206; A01C 7/081; A01C 7/08; A01C 7/00; A01C 7/044; A01C 7/042; A01C 7/04
See application file for complete search history.

(56) References Cited

FOREIGN PATENT DOCUMENTS

| | | |
|---|---|---|
| DE | 102014104154 A1 | 10/2015 |
| DE | 102016204453 A1 | 9/2017 |
| EP | 2683231 B1 | 7/2016 |
| WO | WO2005/011358 A1 | 2/2005 |
| WO | WO2011/056138 A1 | 5/2011 |
| WO | WO2017/068458W A1 | 4/2017 |
| WO | WO2017/079515 A1 | 5/2017 |

*Primary Examiner* — Christopher J. Novosad
(74) *Attorney, Agent, or Firm* — James C. Eaves, Jr.; Brian W. Chellgren; Dentons Bingham Greenebaum LLP

(57) ABSTRACT

A sowing element (1) for agricultural precision sowing machines (100) comprising a seed selection device (10) which includes a casing (10a) and a perforated disc (18) which is caused to rotate in the casing, a pressurization device associated with the casing in order to subject opposite faces (18a, b) of the disc to a pressure differential, an opening (16) in the casing which is for ventilating one of the faces of the disc and which is or can be pneumatically connected to a filtration system (42) or a remote intake system. In this manner, the introduction of sand and powder inside the seed selection device is prevented.

20 Claims, 3 Drawing Sheets

SOWING ELEMENT FOR AGRICULTURAL PRECISION SOWING MACHINES AND SOWING MACHINE COMPRISING THE SOWING ELEMENT

The present invention relates to a sowing element for agricultural precision sowing machines and a sowing machine comprising the sowing element.

It is very widespread to use agricultural precision sowing machines in which the selection and separation of the seed are carried out in a pneumatic manner via a selector of the seed with a perforated disc, the opposing faces of which are subjected to a pressure differential. In the majority of cases, the selector disc is received in a box-shaped casing and divides at the inner side two separate environments. In a first environment, there is defined a chamber for drawing the seed, which is maintained at atmospheric pressure via an opening which is formed in the casing. The second environment is subjected to reduced pressure by means of connection thereof to the intake opening of a powerful centrifugal fan. In this manner, the air drawn in from the first environment towards the second environment through the holes of the selector disc cause a seed to adhere to each hole in order then to place it in a sowing pipe and from there in the ground.

In the specific technical field, it is considered to be necessary to increase the speed of sowing without impairing the precision thereof.

Particular concern is placed on maintaining the sowing spacing, on the precision and constancy of which the success of the sowing operation depends to a great extent. Naturally, the need for precision and for increasing the speed of sowing are in conflict because, as the second increases, the first tends to decrease. The occurrences of friction have a negative effect on this compromise, in particular those deriving from the relatively hostile environment in which the agricultural machines generally operate.

The Applicant has further observed that the hostile environment in which the agricultural precision sowing machines typically operate also has a negative influence on any optical devices which operate on the sowing machine, in particular for controlling the passage of the seeds.

The problem addressed by the present invention is to provide a precision sowing machine which is less influenced by the hostile conditions present in the working environment.

An object of the present invention is also to reduce the negative influence of the occurrences of friction on the precision of sowing and to increase the sowing speed.

Another object is to limit the wear of the key parts of an agricultural sowing machine.

These problems are resolved by a sowing element for precision sowing machines and an agricultural sowing machine constructed in accordance with the appended claims.

The characteristics and advantages of the invention will be better appreciated from the following detailed description of a sowing element and a sowing machine which are constructed in accordance with the present invention and which are illustrated, by way of non-limiting example, with reference to the appended drawings, in which.

Figure 1:
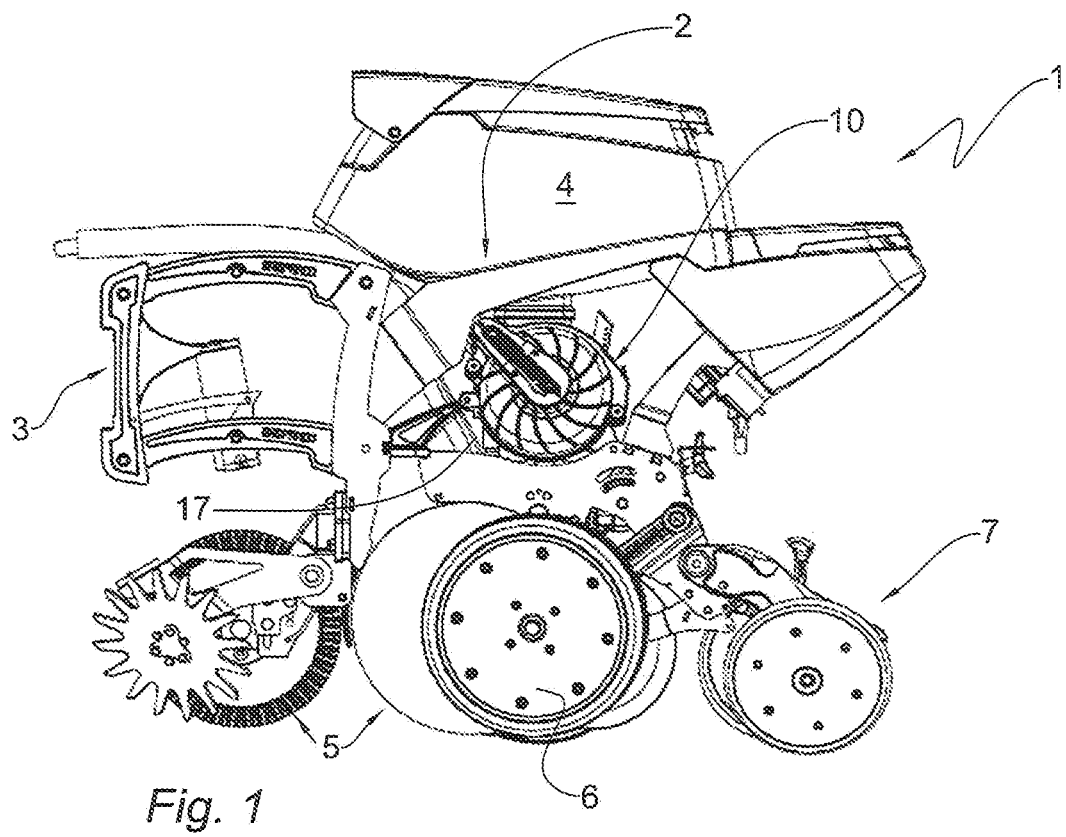
FIG. 1 is a front view of a sowing element which is constructed according to the invention.
Figure 2:
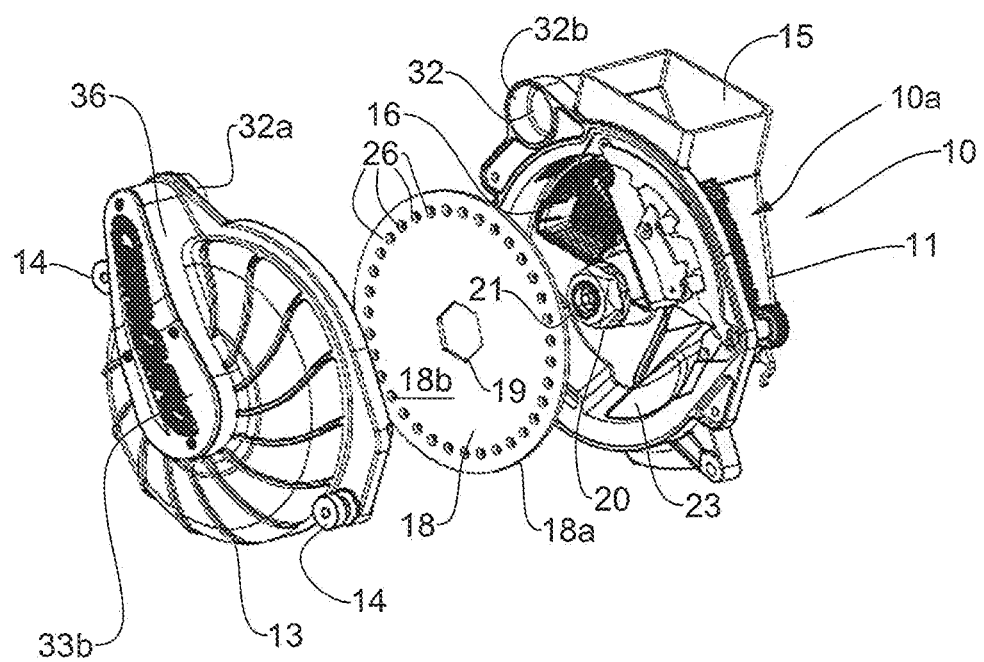
FIG. 2 is an exploded perspective view of a detail of the sowing element of FIG. 1.
Figure 3:
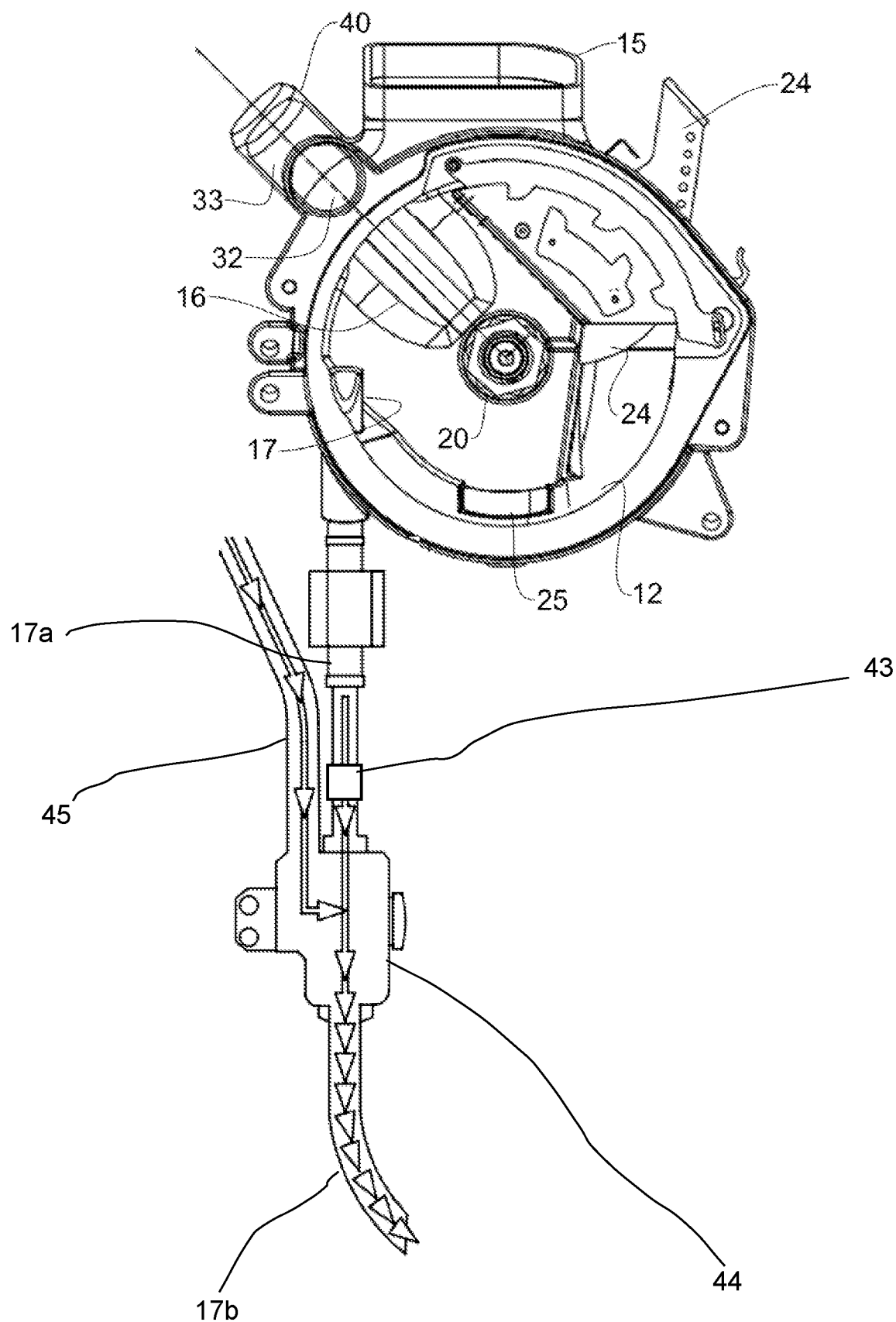
FIGS. 3 to 5 are a front view, cross-section and side view of a component of the detail of FIG. 2, respectively.
Figure 4:
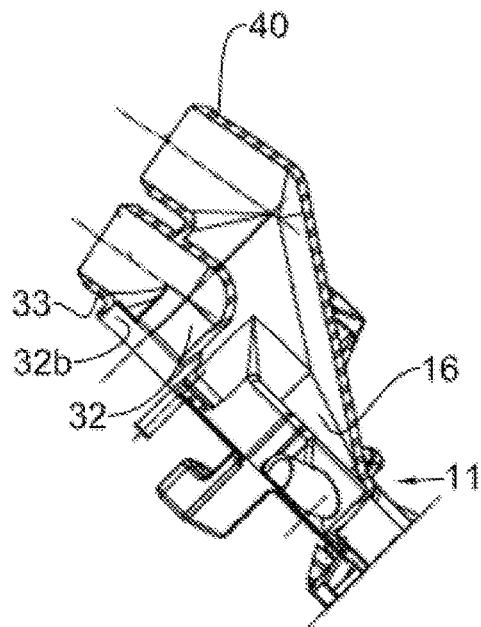
Figures 5, 6:
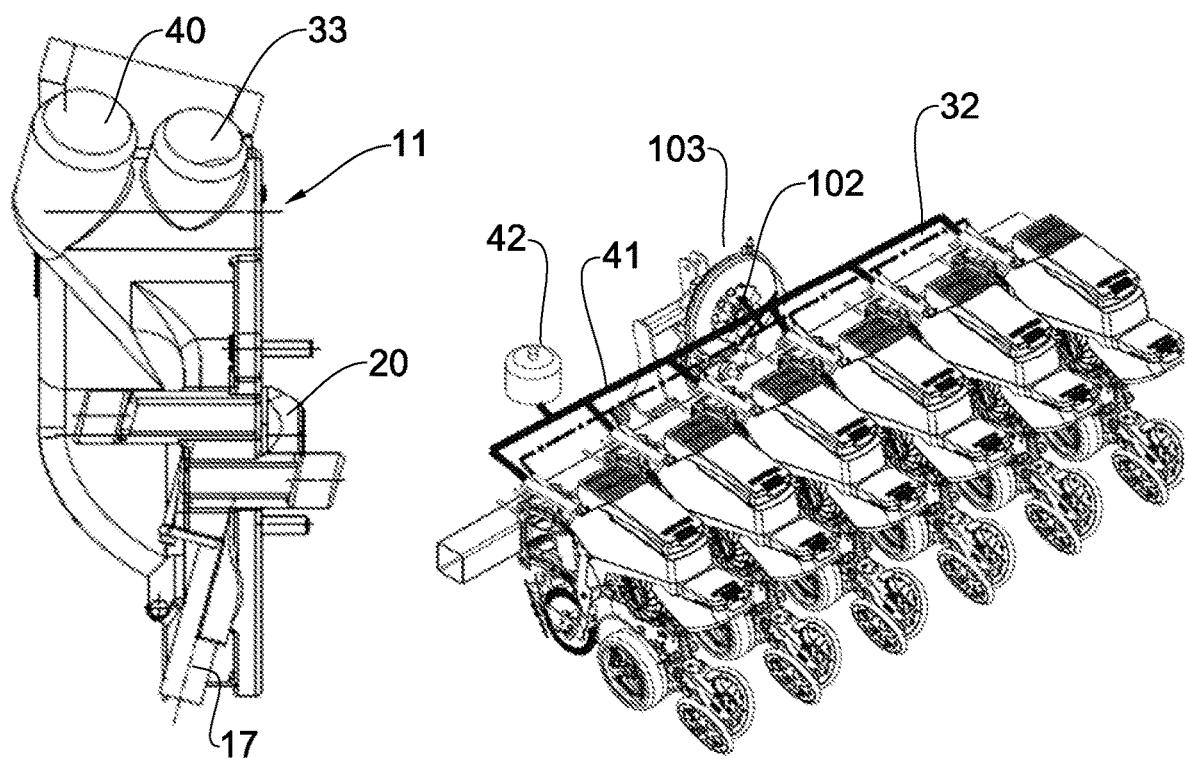
FIG. 6 is a schematic view of a sowing machine constructed according to the invention.

In the Figures, there is generally designated 1 a sowing element for agricultural precision sowing machines. Such a sowing machine is schematically illustrated in its entirety in FIG. 1, in which it is designated 100 and comprises in a manner known per se an element-carrying bar 101, to which there are fixed a plurality of sowing elements 1 which are spaced apart by a pitch.

There is defined in each sowing element 1 a frame 2, an attachment 3, preferably formed, with an articulated parallelogram with which the frame 2 of the element 1 is connected to the element-carrying bar, a hopper-like tank 4 for containing the seed, one or more coulters 5, for example, of the disc type, in order to open a sowing furrow, a pair of wheels 6 for adjusting the sowing depth and a furrow-covering device 7 for closing the furrow which is opened by the coulters 5, re-covering the seed.

There is generally designated 10 a seed selection device which is supplied by falling from the hopper 4 and which is configured to distribute one seed at a time at a correct depth and spacing in the sowing furrow.

The seed selection device 10 comprises a casing 10a which is formed by a box-shaped body 11 which is mounted in a fixed manner on the frame 2 and a cover 13. The box-shaped body and cover can be articulated to each other or more simply secured by means of screws 14, the loosening of which allows the cover to be completely detached from the opening on which it pushes.

There is formed in the box-shaped body 11 a connection 15, on which there is fitted the tank 4, an opening with the function of drawing in air and a descending pipe 17 for the seed. A selection disc 18 is fitted, preferably by means of a polygonal fitting 19 and a relevant hub 20, on the drive shaft 21 of an electric motor or another device for causing the disc to rotate about the individual axis thereof.

There is defined between the base 12 of the box-shaped body 11 and the selection disc 18 a seed drawing chamber 23. It is possible by means of a closure member 24 which is positioned downstream of the connection 15 to adjust the falling flow of the seed from the hopper 4 into the chamber 23 in order to shut it or optionally to interrupt it. An inspection port 25 is positioned in the lowest portion of the chamber 23 so as to allow the complete emptying of the chamber, if necessary.

The selection disc 18 is engaged peripherally by one or more ring(s) of through-holes 26 between the opposite faces 18a, b thereof.

A pressurization pipe of a pressurization device is associated with the selection disc 18 in order to apply a pressure differential between the two faces 18a, b.

Preferably, the pressurization device includes a pressurization distribution pipe 32 which extends through a radial ribbing 36 so as to project from the cover 13. In one embodiment, the pipe 32 is partially integrated in the cover 13 and partially extends into the box-shaped body 11, the two portions being joined by means of a male/female engagement connector 32a, b or one of another type, for example, flanged. The portion of the pipe 32 which is integral with the box-shaped body 11 is terminated with a first sleeve type manifold 33 which is formed on the body 11. The ribbing 36 is formed in a projecting manner on the cover 13 over a main portion of the extent thereof. The pipe 32 for the portion formed in the ribbing 36 is integrated in the cover and is closed in turn by a cover 33b which can be removed for inspection and cleaning. It may be noted that the projecting position of the ribbing 36 with respect to the cover constitutes a handle which allows gripping and manoeuvring of the cover 13 away from and towards the body 11 with a single hand.

In the environment between the disc 18 and the cover 11, which defines a relevant chamber, a negative pressure is applied by means of the pressurization device and is less than atmospheric pressure which is established at the other face of the disc by the effect of connecting the seed drawing chamber to the external environment. The seeds in the drawing chamber are therefore drawn in the region of the holes 26 so as to adhere to the corresponding face of the disc 18 until, during the rotation of the disc 18, the drawing action is interrupted in a manner known per se, bringing about the fall of the seed into the sowing pipe 17.

According to a preferred embodiment, there is provided in the sowing pipe an ejector 44 which is supplied by the pipe 17 and by a compressed air supply 45 which is from a compressed air distributor, for example, a lobed volumetric compressor. The ejector 44 is preferably located in an intermediate zone of the sowing pipe, not behind the seed distributor. This arrangement allows the seed at one side (upstream of the ejector) to be drawn into the sowing pipe and, at the other side (downstream of the ejector), to be discharged at the desired speed. In one embodiment, the sowing pipe 17 comprises at least one rectilinear portion 17a and one curved portion 17b, with the ejector 44 arranged in the region of a transition zone between these portions.

In some embodiments, the seed element 1 further comprises a seed passage detector 43, for example, formed by a photocell.

Preferably, the detector 43 is arranged immediately upstream or downstream of the ejector 44, if present.

The detector 43 allows, in a manner known per se, verification of the correct passage of the seed and therefore allows the operator to be warned in the event of interruptions or irregularities during the transit of the seed along the falling path thereof in the pipe 17.

According to a preferred embodiment, a second manifold 40 with a tubular sleeve is formed on the box-shaped body 11 in the region of the opening 16.

Preferably, the second manifold 40 is connected by means of a pipe 41 to a filtering device 42 for the pressurizing air (which may include a powder decanter, for example, of the cyclone type) or at an intake position which is remote and in the region of which the air available to the pressurization system is relatively clean and non-disrupted. This example involving a negative pressurization of the face 18b of the disc 18, or in which the first manifold is connected by means of a pipe to the intake opening 102 of a ventilation system 103, it is simply necessary for the second manifold to be maintained at the ambient pressure. However, there is provision for the surface 18a to be able to be pressurized positively and in that case the second manifold 40 could be connected to the delivery opening of the above-mentioned ventilation system.

In one embodiment, in the construction of the precision sowing device 100 two or more sowing elements share the same filtering device 42, to which they are connected by means of the respective pipes 41.

Using filtered air for introduction into the casing of the seed selection device, the interior of the sowing device is better protected from powder, sand and other contaminants which may cause damage thereto. There are further reduced the internal frictions of the seed selection device, thereby obtaining an improved precision of sowing, including at high speeds of advance of the sowing machine.

In addition, the air which passes through inside the sowing pipe is also filtered in respect of powder, sand and other contaminants, thereby making the operation of the seed passage detector more efficient.

The invention claimed is:

1. A sowing element for agricultural precision sowing machines, comprising: a seed selection device which includes a casing and a perforated disc which is caused to rotate in the casing, wherein a pressurization device is associated with the casing in order to subject opposite faces of the disc to a pressure differential, and wherein an opening is provided in the casing in order to ventilate one of the faces of the disc, wherein the opening is pneumatically connected to a filtration system or to a remote intake system, wherein the box-shaped casing comprises a fixed box-shaped body and a cover which is removably applied to the box-shaped body, the opening being formed in the box-shaped body, wherein in a region of the opening, at least one manifold is formed on the box-shaped body for an intake pipe or a delivery pipe of the pressurization device, where the box-shaped body comprises a first manifold which is connected to a ventilation system which is capable of subjecting a face of the disc to a negative pressure and a second manifold is connected to the filtration system or to the remote intake system.

2. The sowing element according to claim 1, wherein the filtration system comprises a filter or a powder decanter which is applied to an end of the pipe which is distal from the manifold.

3. The sowing element according to claim 2, further comprising a sowing pipe which is associated with the selection device and a seed passage detector which is arranged along the sowing pipe.

4. The sowing element according to claim 3, further comprising an ejector along the sowing pipe which is supplied by a compressed air dispenser in order to pneumatically accelerate the seeds which are separated by the selection device along the sowing pipe.

5. The sowing element according to claim 4, wherein the seed passage detector is arranged immediately upstream or downstream of the ejector.

6. The sowing element according to claim 1, wherein the first manifold is or can be connected to an intake opening of the ventilation system and the second manifold is or can be connected to a delivery opening of the ventilation system.

7. The sowing element according to claim 6, further comprising a sowing pipe which is associated with the selection device and a seed passage detector which is arranged along the sowing pipe.

8. The sowing element according to claim 7, further comprising an ejector along the sowing pipe which is supplied by a compressed air dispenser in order to pneumatically accelerate the seeds which are separated by the selection device along the sowing pipe.

9. The sowing element according to claim 8, wherein the seed passage detector is arranged immediately upstream or downstream of the ejector.

10. The sowing element according to claim 1, further comprising a sowing pipe which is associated with the selection device and a seed passage detector which is arranged along the sowing pipe.

11. The sowing element according to claim 10, further comprising an ejector along the sowing pipe which is supplied by a compressed air dispenser in order to pneumatically accelerate the seeds which are separated by the selection device along the sowing pipe.

12. The sowing element according to claim 11, wherein the seed passage detector is arranged immediately upstream or downstream of the ejector.

13. An agricultural precision sowing machine including a plurality of sowing elements, where each of the sowing elements comprises a seed selection device which includes a casing and a perforated disc which is caused to rotate in the casing, wherein a pressurization device is associated with the casing in order to subject opposite faces of the disc to a pressure differential, and wherein an opening is provided in the casing in order to ventilate one of the faces of the disc, wherein the opening is pneumatically connected to a filtration system or to a remote intake system, wherein the box-shaped casing comprises a fixed box-shaped body and a cover which is removably applied to the box-shaped body, the opening being formed in the box-shaped body, wherein in a region of the opening, at least one manifold is formed on the box-shaped body for an intake pipe or a delivery pipe of the pressurization device, where the box-shaped body comprises a first manifold which is connected to a ventilation system which is capable of subjecting a face of the disc to a negative pressure and a second manifold is connected to the filtration system or to the remote intake system.

14. The agricultural precision sowing machine according to claim 13, wherein the same filtration system or remote intake system is associated with a plurality of the sowing elements.

15. The agricultural precision sowing machine of claim 13, wherein the filtration system in each of the plurality of sowing elements comprises a filter or a powder decanter which is applied to an end of the pipe which is distal from the manifold.

16. The agricultural precision sowing machine of claim 13, wherein the first manifold in each of the plurality of sowing elements is or can be connected to an intake opening of the ventilation system and the second manifold is or can be connected to a delivery opening of the ventilation system.

17. The agricultural precision sowing machine of claim 16, where each of the plurality of sowing elements further comprising a sowing pipe which is associated with the selection device and a seed passage detector which is arranged along the sowing pipe.

18. The agricultural precision sowing machine of claim 17, where each of the plurality of sowing elements further comprising an ejector along the sowing pipe which is supplied by a compressed air dispenser in order to pneumatically accelerate the seeds which are separated by the selection device along the sowing pipe.

19. The agricultural precision sowing machine of claim 18, wherein the seed passage detector in each of the plurality of sowing elements is arranged immediately upstream or downstream of the ejector.

20. The agricultural precision sowing machine of claim 13, where each of the plurality of sowing elements further comprising a sowing pipe which is associated with the selection device and a seed passage detector which is arranged along the sowing pipe.

\* \* \* \* \*